United States Patent [19]

Forster

[11] Patent Number: 4,581,242

[45] Date of Patent: Apr. 8, 1986

[54] METHOD AND APPARATUS FOR THE BATCHWISE COATING OF ARTICLES

[75] Inventor: Eric Forster, Formby, England

[73] Assignee: Manesty Machines Limited, Speke, Liverpool, England

[21] Appl. No.: 716,257

[22] Filed: Mar. 26, 1985

[30] Foreign Application Priority Data

Apr. 3, 1984 [GB] United Kingdom ............... 8408520

[51] Int. Cl.[4] .................. A61J 3/06; A23G 3/26; B05D 1/02; B01J 8/10

[52] U.S. Cl. ........................................ 427/3; 118/19; 118/20; 118/58; 426/302; 427/212

[58] Field of Search ............... 427/3, 212; 118/19, 118/20, 58; 426/302

[56] References Cited

U.S. PATENT DOCUMENTS

| | | | |
|---|---|---|---|
| 3,357,398 | 12/1967 | Gross | 118/418 |
| 3,834,347 | 9/1974 | Motoyama | 118/19 |
| 4,532,155 | 7/1985 | Golant et al. | 118/20 X |

FOREIGN PATENT DOCUMENTS

| | | |
|---|---|---|
| 3302589 | 2/1984 | Fed. Rep. of Germany . |
| 1203213 | 8/1970 | United Kingdom . |
| 1484566 | 9/1977 | United Kingdom . |
| 2130126 | 5/1984 | United Kingdom . |

Primary Examiner—James R. Hoffman
Attorney, Agent, or Firm—Frishauf, Holtz, Goodman & Woodward

[57] ABSTRACT

Pharmaceutical tablets and the like articles are coated with coating material which is sprayed onto a selected part or parts of a bed of the articles. Drying air or gas is passed through a further part or parts of the bed while the selected part or parts of the bed have little or no drying air or gas passed through them. Articles are continuously transferred between the selected part or parts of the bed and the further part or parts of the bed until all the articles are coated.

23 Claims, 5 Drawing Figures

METHOD AND APPARATUS FOR THE BATCHWISE COATING OF ARTICLES

This invention relates to apparatus for coating small objects such as items of confectionery and pharmaceutical preparations including tablets, pills, pellets, granules and beads with a coating material.

Apparatus for the batchwise coating of tablets, pills, pellets, granules and beads, with sugar, cellulose polymers and many other materials, takes several forms and is well known. These forms include coating pans, both the conventional 'onion' shaped and the side vented pans. They also include fluidised coating systems. These methods suffer from various disadvantages. In the conventional coating pans coating is slow because only items on the surface of the bed are exposed to the drying air or gas. The side vented pans and fluidised coating systems overcome this difficulty by passing the drying air or gas through the bed of objects being coated, so that drying takes place at all levels. The latter types of apparatus operate in different ways. In some the drying air or gas is passed through the bed in the direction which tends to force the objects against the supporting perforated or wire mesh surface. This is usually in the same direction as that in which the coating material is being applied. In others the drying air or gas is introduced through the perforated or mesh surface and flows in the opposite direction to that in which the coating material is being applied.

In the case where the drying air or gas is forcing the objects against the perforated or mesh surface, it has a tendency to densify the bed. In the case of relatively large objects, for example tablets of 15 mm diameter or larger, the voidage of the bed will remain sufficient to allow an adequate quantity of air or gas to flow through. As the volumetric size of the objects decreases the action of the drying air or gas causes the bed to densify to a point where a significant reduction in the flow of drying air or gas takes place, with a resultant extension of the coating time.

In the case where the drying air or gas is passed through the perforation or mesh surface before passing through the bed of objects being coated, it will have a tendency to expand rather than densify the bed. In this type of apparatus the disadvantage is that the drying air or gas, flowing in the opposite direction to the coating material being applied to the objects, will tend to carry some of the coating material away from the objects with a resulting loss in coating material.

An object of the invention is to circumvent these disadvantages of the known apparatus, when used for coating small articles.

According to one aspect of the invention, there is provided a method for the batchwise coating of pharmaceutical or confectionery tablets, pills, granules or other small articles with a coating material comprising passing through a part or parts of a bed of the articles sufficient air or gas to cause drying of the coating material while a further part or parts of the bed have little or no air or gas passing through, applying the coating material to the further part or parts of the bed and then transferring articles between the further part or parts of the bed and the first said part or parts of the bed until all the articles are coated.

The invention also provides an apparatus for the batchwise coating of pharmaceutical or confectionery, tablets, pills, granules or other small articles, comprising means for containing a bed of such articles in a way such that air or other gases can be passed through part or parts of the bed while other parts have either a reduced quantity or no air or gas passing through them and wherein a means is provided for applying coating material to the articles in that part or those parts of the bed which have a reduced air or gas flow or no air or gas flowing through them together with means for interchanging or for transferring articles between the last mentioned part or parts of the bed and the first mentioned part or parts of the bed.

Specific embodiments of the present invention will now be described by way of example, and not by way of limitation, with reference to the accompanying drawings in which.

Figure 1:
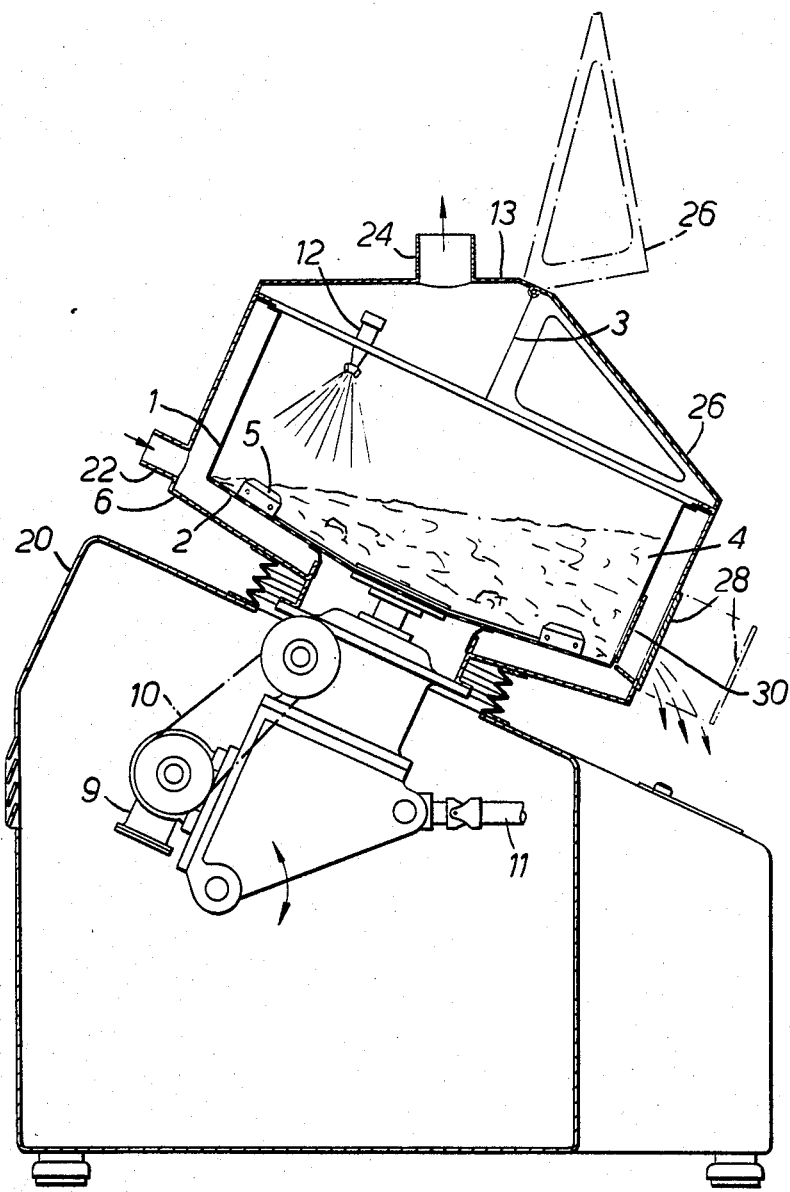
FIG. 1 is a cross sectional side view of an apparatus of this invention.
Figure 2:
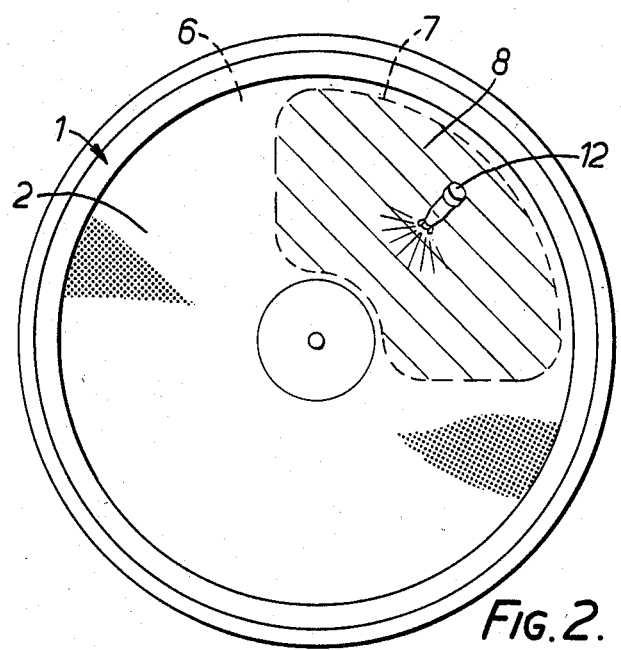
FIG. 2 is a plan view of the apparatus.
Figure 3:
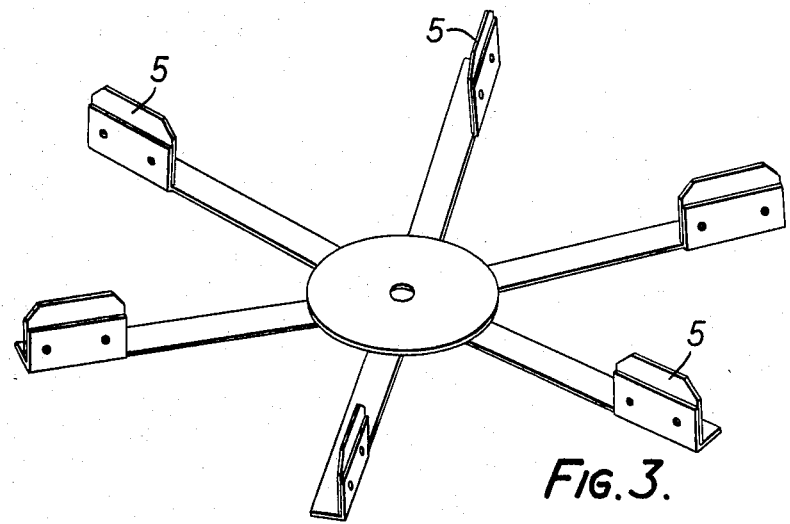
FIG. 3 shows a part of the apparatus.

With reference to the accompanying drawings, the apparatus shown in FIGS. 1 and 2 comprises a shallow open topped pan 1 which has a perforated bottom 2. The pan is rotated about a central axis 3 which causes a bed of articles 4 in the pan to be continually passed between a coating application area and a drying area. Paddles 5 (see also FIG. 3) in the bottom of the pan and fixed relative to the pan so as to rotate with the pan are used to cause the bed of articles to be carried round with the pan and to promote mixing of the bed of articles in the pan to ensure that all articles receive an even coating.

Air is directed to the underside of the pan 1, as it is rotated, by means of an inlet plenum 6 which is fitted with internal baffles 7 best seen in FIG. 2. The air then passes through the perforated bottom of the pan 2 and upwardly through the bed of articles. The baffles 7 serve to create an area or zone within the bed which has a reduced or zero air flow. This area 8 is the coating application area.

A means 9 including an electric motor and drive belt 10 is provided for rotating the pan 1 about its central axis 3. The rotating means is carried with the pan and is arranged to drive the pan at a selectably variable rotational speed. The variation of the speed of rotation controls the duration of the articles in the coating application area 8.

The pan and its drive means is carried from an angularly adjustable frame and a means 11 of changing the angle of the axis 3 with respect to the vertical is provided. By this means the relative depths of the bed in the coating application and drying areas can be varied.

A spray or group of sprays 12 is situated above the coating application area 8 as a means of applying the coating material downwardly onto a bed of articles being rotated by the pan and it will be noted that the spray or sprays are positioned to spray the coating material onto the shallowest region of the bed.

A hood 13 or other means of conducting away the drying air as it leaves the bed is also provided.

In the construction just described, the perforated bottom of the pan is made separately removable for cleaning and inspection, along with the paddles 5, and may be replaced as necessary.

Figure 4:
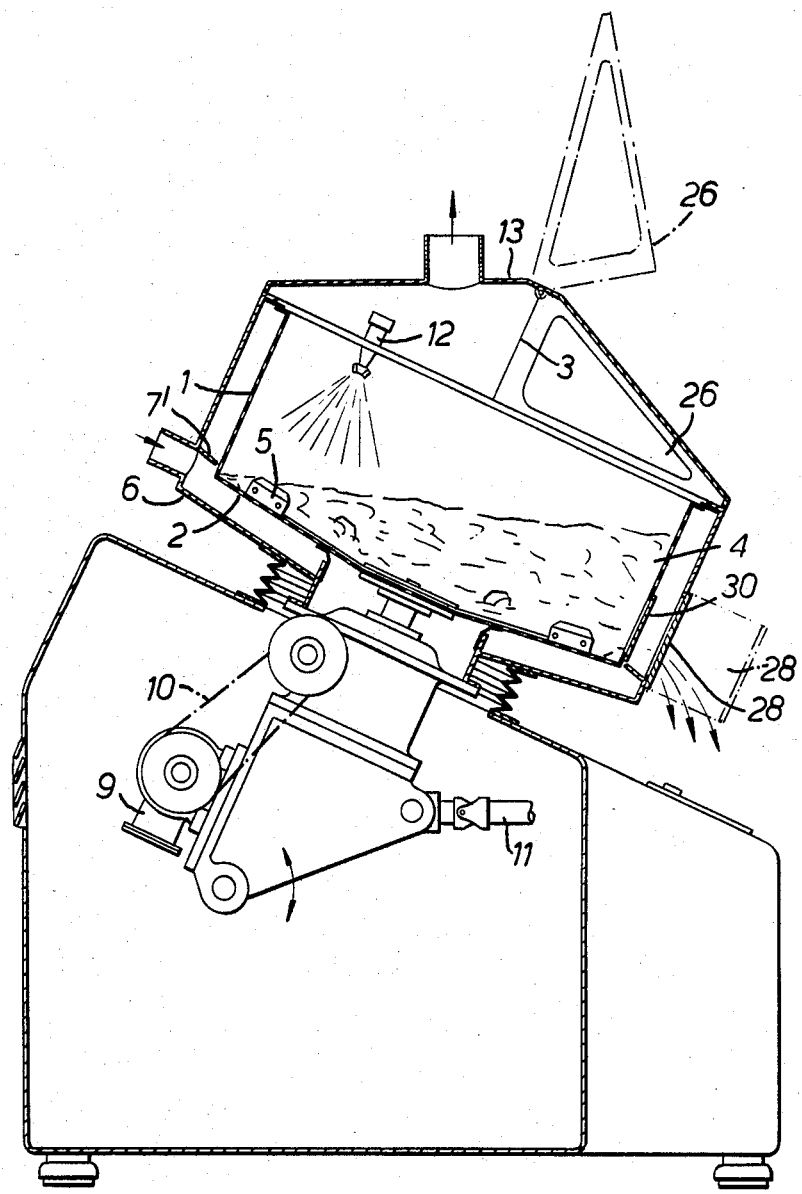
FIG. 4 is a view corresponding with FIG. 1 showing a modified apparatus of this invention.

FIG. 4 shows a modified apparatus in which the whole of the pan 1 is composed of perforated sheet or wire mesh and additional baffles 7' are provided to ensure that the drying air flows upwardly mainly or only through the perforations in that area of the bottom of the pan outside the zone 8 created by the baffles 7.

It will be appreciated that there is a continual mixing of the articles in the pan, promoted by the paddles 5, as the pan is rotated, in as far as the surface of the bed of articles remains approximately horizontal as shown in FIGS. 1 and 4. Thus, the pan is rotated sufficiently slowly to allow a tumbling action of the articles during coating, the articles continually tumbling out of the coating zone which is substantially free of any upcurrent of air which might otherwise interfere with the spraying of coating material downwardly onto the upper surface of the bed of articles, into the drying zone as the pan is rotated.

The pan 1 and means 9 are mounted within a stationary housing 20 carrying the hood 13 and the baffles 7 which form the plenum 6, the housing having an air inflow connection 22 to the plenum and the hood 13 having an air outflow connection 24, the hood covering the top of the housing. The hood 13 is additionally provided with a loading door 26 for loading articles into the pan 1 and the housing has an unloading door 28 for unloading articles from the pan through an unloading door 30 in the pan.

Figure 5:
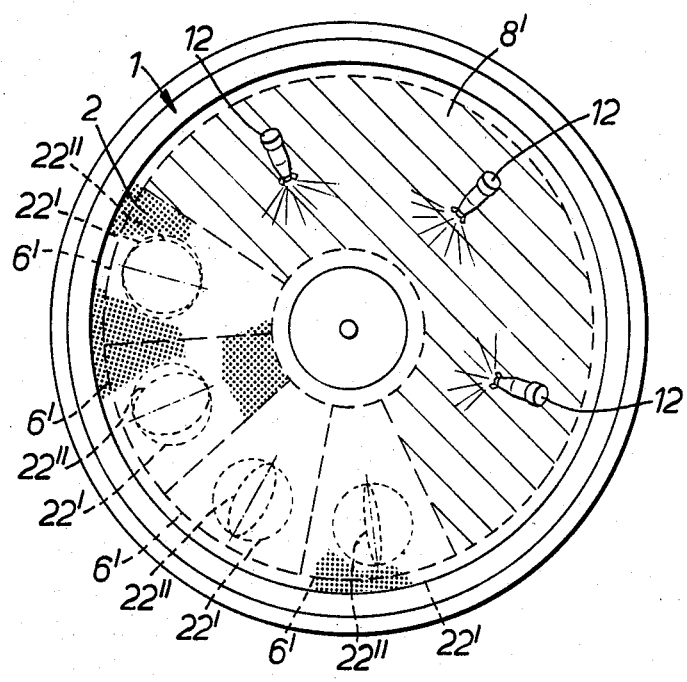
FIG. 5 is a plan view corresponding with FIG. 2 showing a further modified apparatus of this invention.

FIG. 5 shows a further modified apparatus in which the area or zone 8' within the bed of articles 4 which has a reduced or zero airflow is made larger than as shown in FIG. 2 and the air is directed to the underside of the pan 1, as it is rotated, by means of four separate plenums 6' each having its own airflow connection 22' and its own airflow control damper 22", to regulate the amount of air flowing through that part of the bed of articles below which that particular plenum 6' is situated.

Since the pan 1 rotates at an angle about its central axis 3, the bed of articles 4 in the pan varies in depth over the area in which the drying air is passing upwardly through the bed. By separately controlling the flow of air to the various plenums 6' in dependence upon the tilt angle of the axis 3, it is possible to ensure a more even flow of drying air passing upwardly through the bed, since if left uncontrolled, more drying air would tend to pass through the shallower parts of the bed than through the deeper parts of the bed.

I claim:

1. A method for the batchwise coating of pharmaceutical or confectionery tablets, pills, granules or other small articles with a coating material comprising passing through a part or parts of a bed of the articles sufficient air or gas to cause drying of the coating material while a further part or parts of the bed have little or no air or gas passing through, applying the coating material to the further part or parts of the bed and then transferring articles between the further part or parts of the bed and the first said part or parts of the bed until all the articles are coated.

2. A method as claimed in claim 1 comprising transferring the articles between the further part or parts of the bed and the first said part or parts of the bed by rotating the bed.

3. A method as claimed in claim 2 further comprising increasing the depth of the bed as between said further part or parts of the bed and said first said part or parts of the bed by rotating the bed about an inclined axis of rotation.

4. A method as claimed in claim 3 further comprising separately controlling the flow of drying air or gas to said first said parts of the bed in dependence upon the different depths of said first said parts of the bed, thereby to create a more even flow of drying air or gas passing upwardly through said first said parts of the bed.

5. A method as claimed in claim 4 further comprising mixing the articles in the bed whilst rotating the bed to promote an even coating of the articles.

6. A method as claimed in claim 4 comprising spraying the coating material onto said further part or parts of the bed.

7. A method as claimed in claim 3 further comprising mixing the articles in the bed whilst rotating the bed to promote an even coating of the articles.

8. A method as claimed in claim 3 comprising spraying the coating material onto said further part or parts of the bed.

9. A method as claimed in claim 2, further comprising mixing the articles in the bed whilst rotating the bed to promote an even coating of the articles.

10. A method as claimed in claim 2, oomprising spraying the coating material onto said further part or parts of the bed.

11. An apparatus for the batchwise coating of pharmaceutical or confectionery, tablets, pills, granules or other small articles, comprising means for containing a bed of such articles in a way such that air or other gases can be passed through part or parts of the bed while other parts have either a reduced quantity or no air or gas passing through them and wherein a means is provided for applying coating material to the articles in that part or those parts of the bed which have a reduced air or gas flow or no air or gas flowing through them, together with means for interchanging or for transferring articles between the last mentioned part or parts of the bed and the first mentioned part or parts of the bed.

12. An apparatus as claimed in claim 11 wherein the containing means is an open topped pan or drum.

13. An apparatus as claimed in claim 11 wherein the containing means is wholly or in part constructed from perforated sheet or wire mesh.

14. An apparatus according to claim 13 wherein the perforated or wire mesh portion of the containing means is separately removable and replaceable.

15. An apparatus as claimed in claim 11 wherein the interchanging or transferring means comprises means for rotating the containing means.

16. An apparatus as claimed in claim 15 comprising means for varying the speed of rotation of the containing means.

17. An apparatus as claimed in claim 15 wherein the containing means is mounted for rotation about an inclined axis to increase the depth of the bed of articles as between the part or parts of the bed where air or gases are to be passed through the bed and the part or parts of the bed where there is to be a low or zero air flow through the bed.

18. An apparatus as claimed in claim 17 wherein the inclination of the axis of rotation of the containing means is adjustable.

19. An apparatus as claimed in claim 17 further comprising separate means for leading air or gases to be passed through the bed to different parts of the bed where air or gases are to be passed through the bed, and means for controlling the flow of air or gases through said separate means in dependence upon the different depths of said different parts of the bed to ensure a more even flow of drying air or gas passing through said different parts of the bed.

20. An apparatus as claimed in claim 19 wherein the interchanging or transferring means comprises paddles or baffles within the containing means.

21. An apparatus as claimed in claim 17 wherein the interchanging or transferring means comprises paddles or baffles within the containing means.

22. An apparatus as claimed in claim 15 wherein the interchanging or transferring means comprises paddles or baffles within the containing means.

23. An apparatus as claimed in claim 1 wherein the coating material applying means is constituted by one or more sprays for spraying coating material onto a bed of articles contained in the containing means.

* * * * *

UNITED STATES PATENT AND TRADEMARK OFFICE
CERTIFICATE OF CORRECTION

PATENT NO. : 4,581,242
DATED : April 8, 1986
INVENTOR(S) : E. FORSTER

It is certified that error appears in the above-identified patent and that said Letters Patent is hereby corrected as shown below:

COLUMN 4, line 23 (claim 10), change "oomprising"

to --comprising--;

COLUMN 6, line 7 (claim 23), change "in claim 1" to

--in claim 11--.

Signed and Sealed this

Second Day of December, 1986

Attest:

DONALD J. QUIGG

Attesting Officer     Commissioner of Patents and Trademarks